US006173291B1

(12) United States Patent
Jenevein

(10) Patent No.: US 6,173,291 B1
(45) Date of Patent: Jan. 9, 2001

(54) METHOD AND APPARATUS FOR RECOVERING DATA FROM DAMAGED OR CORRUPTED FILE STORAGE MEDIA

(75) Inventor: Roy M. Jenevein, Austin, TX (US)

(73) Assignee: PowerQuest Corporation, Orem, UT (US)

(*) Notice: Under 35 U.S.C. 154(b), the term of this patent shall be extended for 0 days.

(21) Appl. No.: 08/939,085

(22) Filed: Sep. 26, 1997

(51) Int. Cl.[7] ............................................. G06F 17/30
(52) U.S. Cl. ...................... 707/200; 707/202; 707/205; 707/206
(58) Field of Search ........................... 707/200, 206, 707/202, 205

(56) References Cited

U.S. PATENT DOCUMENTS

| | | | |
|---|---|---|---|
| 4,941,059 | 7/1990 | Grant | 360/72.1 |
| 5,083,264 | 1/1992 | Platteter et al. | 395/182.03 |
| 5,276,860 * | 1/1994 | Fortier et al. | 395/575 |
| 5,321,824 * | 6/1994 | Burke et al. | 711/220 |
| 5,421,006 | 5/1995 | Jablon et al. | 395/183.12 |
| 5,432,928 * | 7/1995 | Sherman | 707/3 |
| 5,469,573 | 11/1995 | McGill, III et al. | 395/712 |
| 5,473,753 * | 12/1995 | Wells et al. | 395/218 |
| 5,493,649 | 2/1996 | Slivka et al. | 395/185.01 |
| 5,535,381 | 7/1996 | Kopper | 395/872 |
| 5,555,405 * | 9/1996 | Griesmer et al. | 707/205 |
| 5,561,786 * | 10/1996 | Morse | 711/170 |
| 5,594,863 | 1/1997 | Stiles | 395/182.13 |
| 5,603,020 | 2/1997 | Hashimoto et al. | 707/200 |
| 5,623,651 | 4/1997 | Jernigan, IV | 707/206 |
| 5,761,404 * | 6/1998 | Murakami et al. | 395/182.13 |
| 5,832,526 * | 11/1998 | Schuyler | 707/205 |

OTHER PUBLICATIONS

Mendelson, Edward, PC Tools Deluxe 5.5 (Software Review), PC Magazine, Mar. 27, 1990, p. 112.
Garofolo, Denise A., "Take Charge!: A Diverse Package of Utillities", Information Today, Jul.–Aug. 1990, p. 13.
Morgenstern, Steve, "Make Your Computer Faster, Safer, Easier to Run (Using Disk Utility Software)", Home Office Computing, Sep., 1991, p. 46.
Ayer, Rick, "What's the Price of a Free Lunch?", PC Magazine, Sep. 14, 1993, p. 108.
Shatz–Akin, Jim, "The Big Squeeze (Software Review)", MacUser, Jan., 1994, p. 129.
"PC Crasch? Call Rescue 911!", Newsbytes News Network, Apr. 21, 1997, page N/A.

* cited by examiner

Primary Examiner—Paul R. Lintz
Assistant Examiner—Jean Bolte Fleurantin
(74) Attorney, Agent, or Firm—Marc A. Hubbard

(57) ABSTRACT

An automated method and apparatus for identifying and copying lost files from a mass data storage device of a computer when file system information (as opposed to the actual data files) stored on the mass data storage device has been corrupted or destroyed. The mass data storage device is scanned on a sector-by-sector basis in order to attempt to identify sectors containing file system data structures and file attributes. Identification is made using data signature and/or pattern matching filters. The location of, and any valid information found in, such sectors is used then to derive information useful in locating files to be copied to another storage device. For example, in a FAT, NTFS or other cluster-oriented file system, if information on the number of sectors per cluster (SPB) is not available from a boot directory, it and a cluster base (the starting sector of cluster 0) are calculated using the physical location of the beginning sectors of the directories or folders. When a starting cluster is known from a directory entry, but not additional file allocation information, a cluster chain may be reconstructed utilizing one or more of several disclosed methods.

50 Claims, 10 Drawing Sheets

METHOD AND APPARATUS FOR RECOVERING DATA FROM DAMAGED OR CORRUPTED FILE STORAGE MEDIA

TECHNICAL FIELD OF INVENTION

The invention pertains generally to methods and apparatus for recovering data files from mass data storage devices when file system information is corrupted or missing.

BACKGROUND OF THE INVENTION

The main components of a general purpose, programmable, digital computer, as illustrated by a representative computer 10 shown of FIG. 1, are a central processing unit (CPU) or processor 12 for manipulating data according to a program of instructions, and a main or working memory 14 for temporarily storing data, including program instructions. (The term "data" will be used generically, unless the context otherwise indicates, to mean any information in digital form stored by a computer, including, without limitation, program instructions, text, business data and commands.)

Most computers also include one or more mass or high capacity data storage devices for long term storage of data in the form of files. There are many types of mass data storage devices available, including, for example, magnetic and optical tape, magnetic, magneto-optical and optical disks, and solid state (e.g. flash memory). Most, but not all, of these devices and media are non-volatile; i.e. they do not require power to maintain long-term memory. Many can be written to one or more times. In addition to the basic, physical properties of their respective storage media, they differ in manner (sequential versus random) of access, speed of access, cost per unit of data storage and storage capacity, among other characteristics. The type of device selected often depends on the requirements for the particular computer. Unlike the main memory, which stores data in directly accessible small units, i.e. bytes, mass data storage devices are set up to receive and make data available to the CPU in comparatively large blocks. Mass data storage devices are treated as peripheral input/output (I/O) devices, meaning that they and/or their controllers are set up (in hardware, software or both) transfer data in relatively large (e.g. 512 byte) blocks.

Most modern computers utilize at least one or more magnetic disk media for high-capacity storage, as such media currently offers a good combination of speed of access, capacity and cost. In the representative computer of FIG. 1 the mass data storage devices are a floppy disk drive 16 and its controller 18, and hard disk drive 20 and its controller 22. Conventionally, the floppy disk drive receives a removable flexible, magnetic disk 17. The hard disk drive includes a stack of spatially-separated, stiff, magnetic platters, which are usually fixed, but may also be made removable. The controllers for the respective disk drives translate basic commands received from the CPU into the appropriate actions for that particular disk drive, and control the flow of data to and from the disk drives. Computers will often include other types of mass data storage devices, such as CD-ROM drives and tape drives.

In addition to mass data storage devices, the computer 10 also includes various other peripheral components or I/O devices with which the CPU communicates, including, for example, a keyboard 24, a video monitor 26 and its graphics adapter 28. In the simplest form of the computer 10, the CPU, main memory, the mass data storage devices and the I/O devices communicate over a single system bus, which is designated 30 in the figure. However, most computers use more complex types of bus arrangements for enabling communication between the CPU, the main memory, and the various I/O devices.

There is also a separate, non-volatile, solid state read-only memory 32 for storing what is referred to as the "BIOS" or "Basic Input/Output System," which is permanently resident software, separate from an operating system. The BIOS software routines, when executed by the CPU, translate certain "calls" from an executing program wanting to access an I/O device, whether it be an operating system or an application program, into a sequence of commands that are provided, or stored in registers of, a particular I/O device or its controller for execution by the controller. By segregating hardware-dependent I/O device access routines from other programs running on the computer, higher level programs, such as operating systems and applications programs, need not be written for specific computer hardware, allowing at least some level of compatibility among different hardware systems. The BIOS also includes software for handling certain types of errors which occur with the I/O devices, as well as instructions for testing various components of the computer when it is powered up and loading an operating system from a disk drive.

Disk drives are physically addressed by the BIOS using a cylinder, head and sector number. A typical hard disk includes multiple platters rotating on a common axis. On each side of each platter are arranged concentric tracks. Tracks having the same diameter or radius lie within a "cylinder." Each side of each platter is read and written to by a separate a read/write head which moves across the tracks. The head and cylinder numbers uniquely identify a track, and the sector number uniquely identifies one of the sectors within a tract. The cylinder, head and sector ("C,H,S") address 0,0,1 is always occupied by a partition sector. Hard disks for may be used by a computer to store more than one operating system, which means that more than one type of file system may be used to store files on a hard disk. A hard disk is therefore partitionable into multiple "drives" or "volumes." The partition sector stores a table specifying the start and end of each partition, or a link to the next partition, as well as some other basic information about the disk. Most operating systems address sectors using a logical block address rather than the C, H, S address. A logical block address (LBA) is a sequential numbering of the sectors within a partition or drive. It is one of the BIOS' functions to translate between the LBA and a physical C,H,S address.

As previously mentioned, data is organized for storage into files. Depending on the size of the file and the size of the sectors in the storage device in which it is stored, files may be stored over one or more sectors of the storage device. It is the job of an operating system, particularly its file system, keep track of what files are stored, and where they are stored, in the storage device. Generally, this file information is also stored in the same device as the files. Some of the information is typically stored in designated sectors or areas set aside for that purpose.

Each operating system has a different file system. The File Allocation Table (FAT) file system is the native file system for IBM-standard personal computers running the MS-DOS®, Windows™ 3.x and Windows™ 95 operating systems of Microsoft Corporation, and it is supported by Microsoft Corporation's Windows-NT. The FAT file system was originally developed for small capacity, floppy disks, but has been extended to be used for today's very large capacity disk drives. The FAT file system has several versions. The ones used by earlier versions of the MS-DOS and Windows 3.x operating systems are generally referred to as the FAT-12 and FAT-16 file systems. Microsoft WINDOWS 95 supports FAT-12, FAT-16 and a 32 bit version called FAT-32. Microsoft Corporation's Windows NT™ operating system utilizes a native file system known NTFS, or New Technology File System, and also supports the HPFS file system developed by IBM for the OS/2® operating system. These systems share, to varying degree, a similar approach to managing files on the disks.

FIGS. 2a and 2b illustrate, respectively, examples of how the FAT-16 and FAT-32 file systems organize data on a hard disk or other mass data storage device. Each has a partition sector 34a starting at C,H,S=0,0,1. (A floppy disk is generally not partitionable, and therefore has no partition sector.) Following each partition sector, there is a bootstrap sector, which starts at a fixed location (C,H,S=0,1,1) so that the BIOS always knows where to find it. In the FAT-16 system, there is a single boot sector 36. In the FAT-32 system, there are two, identical boot records, each labeled 38a, for redundancy. The boot records store basic information about the disk needed by the file system, as well as a program for loading the operating system from the disk.

The FAT file systems, like the file systems used by many operating systems, allocate clusters of sectors, rather than individual sectors, for file storage. The number of sectors per cluster within a partition is fixed during formatting of the storage device and stored in the boot record. The files are grouped into directories. The directors are organized hierarchically starting with a root directory 40a. The root directory in the FAT-16 system is in a fixed location in the storage device so that it can be found. However, the FAT-32 file system need not store the root directory at a fixed location. The remaining directories, which are set up by a user, are sub-directors of the root directory, can be located anywhere within the data area 44a, along with the files.

Each user directory includes an entry pointing to itself, identified by a "." and listing its starting cluster; an entry for its parent directory, if any, identified by a ".." and listing its parent's starting cluster; an entry for each first-order sub-directory, which includes its name and starting cluster creation date/time (and a provision for long time names in Windows 95); and an entry for each file stored in that directory, which includes its name, length and starting cluster. Each directory is allocated at least one cluster for storing this information. Basically, each entry in a directory acts as a pointer to the starting cluster of a file, sub-directory or parent directory. If a file is allocated more than one cluster, the additional clusters must be chained together by the operating system by looking up a pointer to the next cluster in file allocation table (FAT) 46a for the partition.

The FAT 46a is stored between the boot records and the root directory. Because of its importance, there are two copies stored. It has one entry for each cluster in a partition. The entry will indicate that the cluster is available, being used or is bad. If it is one of the clusters in a chain of clusters making up a file, it will include the cluster number for the next in the chain or a special, predefined character or value for indicating that it is the last cluster in the chain. The FAT for the FAT-32 file system also stores the starting cluster for the root directory. In the FAT-16 table each entry is a 16 bit cluster address and in FAT-32 each entry is a 32 bit cluster address.

The storage devices illustrated by FIGS. 2a and 2b have been partitioned by second partition sectors 34b. The second partitions also include boot records, 36b and 38b, respectively, root directories 40b, data areas 44b and FAT tables 46b.

Referring now to FIG. 3a, in the New Technology File System ("NTFS"), a storage device or disk formatted for the NTFS includes a master partition sector 34a and a boot sector 36a at fixed, predetermined addresses. However, following the boot sector, there is allocated space for, in order, a master file table (MFT) 50a, a partial copy 52a of the MFT, and other NTFS metadata files 54a. The remaining unallocated area of sectors 56a, up to the extended partition sector 58, is used for storing user files and index buffers, which can be thought of as a form of a directory. Following the extended partition sector is another volume, or partition, with it own boot sector 36b, MFT 50b, partial MFT copy 52b and NFTS metadata files 54b for that volume, and an area of user files and directories 56b. The storage device may have, if desired, additional extended partitions, defining additional volumes. NTFS can be considered an extension of OS/2's HPFS and includes file security features.

All data stored on an NTFS volume is stored in a file, including the NTSF data structures used to locate and retrieve files, the bootstrap data file (which is stored in the predefined boot sector) and a bitmap file which records the allocation state of each cluster on the volume. NTFS data structures are referred to as metadata files, and also include a log file, volume file, attribute definition table, root directory and bad cluster file, among others.

Like the FAT file systems, space in the volume is allocated in clusters of sectors. The number of sectors in each cluster is fixed within a volume. The clusters are numbered sequentially from the beginning to the end of the volume. These numbers are called logical cluster numbers (LCN).

Each file, including the MFT, boot file and other metadata files, has an entry in the MFT. Each is treated as a "file," as are the user directories and files. Each "file" in the MFT is defined by a row of attributes. These attributes include things like the names of the file (more than one is possible), time stamps for creation and modification dates, its MS-DOS attributes and security descriptors. There is a "data" attribute for user files, which may be used to store actual file data for small user files. A file may have additional "named attributes." For a directory, the data area is used to store attributes for a sorted index pointing to the files that are grouped in the directory. The index for a file includes the files name and reference number, which is a pointer to the file's entry in the MFT.

The MFT is a fixed size. In the event a file attribute cannot fit within the entry area allocated to the file, the attribute is stored outside the MFT, in which case it is called a non-resident attribute. For a user file (as opposed to a directory), a group of consecutive clusters where a nonresident attribute is stored is called a data run. If an attribute's value is non-resident, its header, which always remains resident, indicates that is non-resident, and it is followed by a pointer to the LCNs of the clusters where the attribute is actually stored. This is accomplished by recording the starting virtual cluster number (which is a sequential numbering of clusters within the file) for each run, with the LCN where the run begins, as well as the number of clusters in the run. In essence, data runs are the same as the files in the FAT file systems, and the VCN to LCN mapping is similar to the starting cluster information for the file in the directory of a file system. However, unlike the FAT system, the number of clusters or length in a run is available in NTFS in the same entry as the starting cluster number, as is also the starting clusters and length of other runs storing the file. Thus, in NTFS, there is no need for a separate FAT to store cluster allocation information. A separate bitmap file, which is one of the NTFS metadata files, indicates whether a cluster is available for allocation or is already allocated within the cluster.

For a directory, a group of clusters storing non-resident file index information is called an index buffer. The index attribute in a directory's entry in the MFT includes an index root segment, an index allocation segment and a VCN allocation bitmap. The root index contains the next higher order file number for each index buffer. For example, if files 1, 2 and 3 are stored in a cluster run constituting a first index buffer for a directory, file 4 (or the next highest ordered file number in the directory) is stored as the root. For each root, there is a VCN-LCN mapping in the index allocation segment, which includes the starting VCN and LCN of the index buffer and the number of clusters in the buffer. The bitmap segment tracks which of the VCN's in the allocated cluster runs are free for storing additional indexes within the directory entry. The index buffers are thus, in many respects like a directory stored in the data user area in the FAT systems.

Because data for the file system for a particular storage device is stored on the device itself, a computer crash, hardware malfunction or programming glitch can destroy critical data necessary for retrieving files. Magnetic disk drives, in particular, are susceptible to data corruption, though it can happen to any media to which data is written, or on which it is stored. For example, file system information can be corrupted by damage to the disk media caused by physical shock or, in conventional hard disk drives, a crash of a read/write head should the disks suddenly stop rotating. A hardware malfunction in the device's controller, a bad memory chip or poorly written software can also corrupt file system data. A power outage can strike before caching software has written all of its cached data to a file on the device. Improper powering-down of a computer can leave critical file system information stored in memory, before it is written to the device.

The FAT file system is particularly at risk. Most file system corruption occurs near the beginning of a disk partition, where the most critical FAT file system information resides. There are computer viruses that specifically target a FAT partition table or boot record, which can wipe out critical information necessary to retrieve files. There is a "wrapped around" effect which may cause data in the FAT file system to be overwritten when a large capacity disk is replaced in an older computer that does not have an EIDE disk controller, and the LBA mode disk access or the large capacity disk software driver is improperly installed.

Furthermore, if information on the numbers of sectors per cluster (SPC) is lost, any file system information storing location of files and directors using clusters becomes useless. If information on where extend partitions exist is lost, all file system information for an entire partition is effectively lost.

Prior art utility programs for recovering files stored in FAT file systems, such as Norton Utilities, usually try to "fix" corrupted file system information by writing new file system data to the disk so that the operating system can then access the files from the device. However, these fixes are often ineffective, and may cause valuable data to be overwritten in the process.

SUMMARY OF THE INVENTION

The invention pertains generally to automated methods and apparatus for identifying and copying lost files from a mass data storage device of a computer when file system information (as opposed to the actual data files) stored on the mass data storage device has been corrupted or destroyed, without writing or attempting to repair file system information on the mass data storage device. As embodied in a method and apparatus for recovering files from a damaged or corrupted mass data storage device, there are several inventive aspects, a few of which, and their advantages, are summarized below.

According to one aspect, a computer reads a mass data storage device on a sector-by-sector basis in order to attempt to identify, and thus locate, through the use of data signature and/or pattern matching "filters," sectors containing file system data structures and file attributes, whether or not the information in such sectors is valid. These sectors may include, for example, partitions, which logically divide the storage device into separate file spaces or volumes and file system data structures (for example, the FAT tables, MFTs or similar cluster allocation data structures). They also may include file attributes, including, for example, directories or folders in the FAT and MAC OS file systems, non-resident file attributes such as index buffers in NTFS, or other hierarchical file organization data structures (which are sometimes generically referred to herein as directories), which may be stored in user data areas.

In accordance with another aspect, the location of, and any valid information found in, the sectors, is used to derive information useful in locating files to be copied to another storage device. For example, in a FAT, NTFS or other cluster-oriented file system, if information on the number of sectors per cluster (SPB) is not available from a boot directory, it and a cluster base (the starting sector of cluster 0) are calculated using the physical location of the beginning sectors of the directories or folders.

According to a further aspect, in the event sector or cluster allocation information is missing for a known file or directory for example, when the starting cluster is known from a directory entry, but not additional file allocation information—a cluster chain may be reconstructed utilizing one or more of several methods. The methods include recovering clusters in sequence from the starting cluster which is large enough to hold the file, assuming recent disk defragmentation; automatic grouping of lost clusters by data type, determined through analysis of the file data, starting with the smallest files, and assuming sequential cluster allocation; or matching by a user through use of a visual interface displaying in close, spatial proximity the end of a last known cluster in file to an available cluster.

These and other aspects and advantages will be apparent from the following detailed description of a preferred embodiment, read in conjunction with the appended drawings.

DETAILED DESCRIPTION

Figure 1:
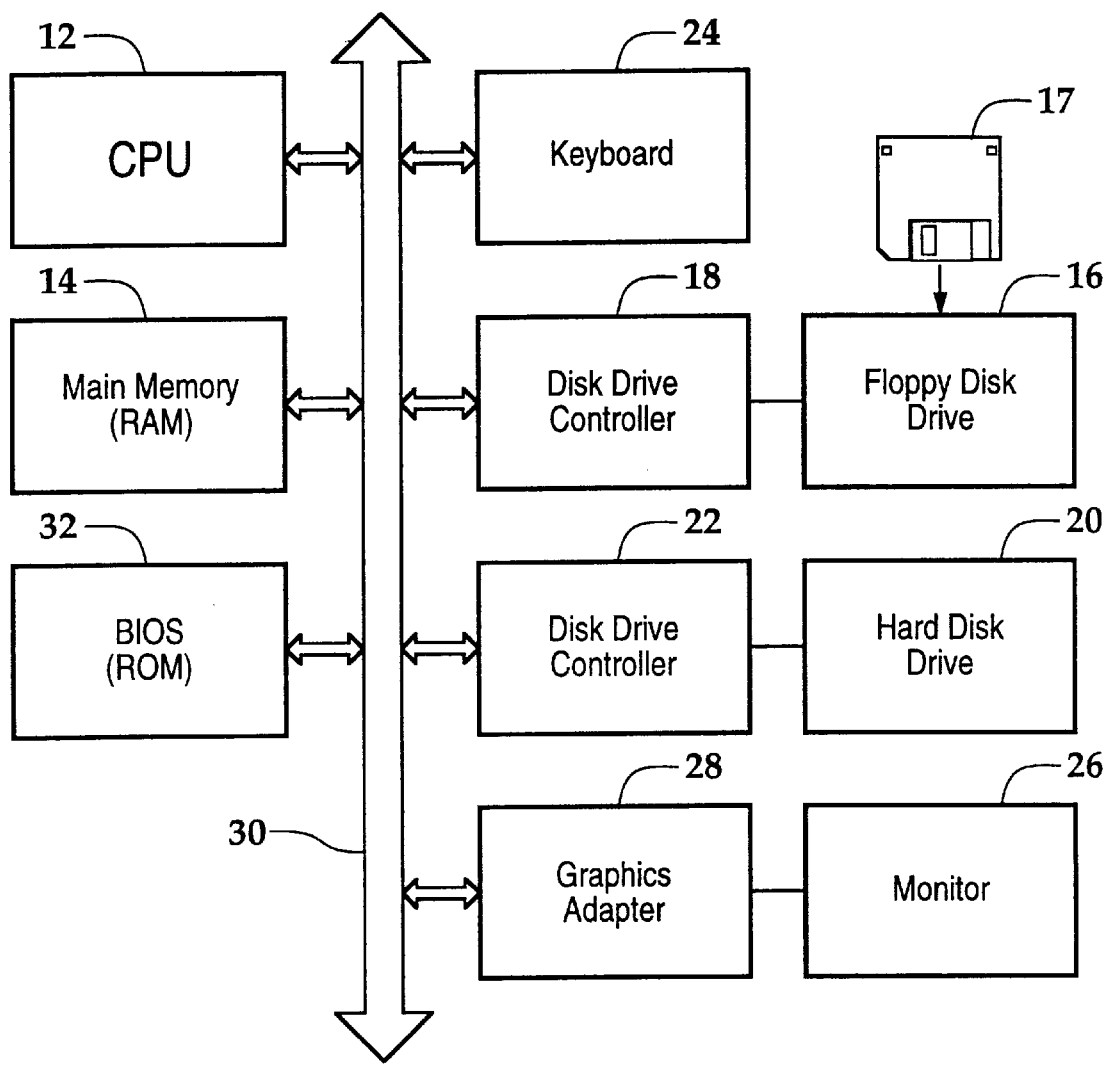
FIG. 1 is a schematic diagram of a representative computer.
Figure 2A:
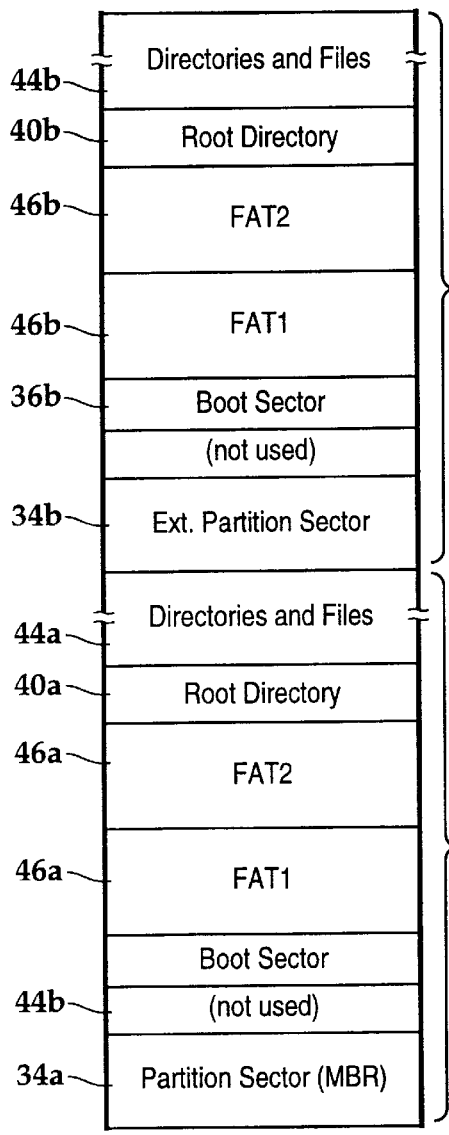
FIG. 2a is an schematic representation of the use of sectors in a mass data storage device storing files using the FAT-16 file system.
Figure 2B:
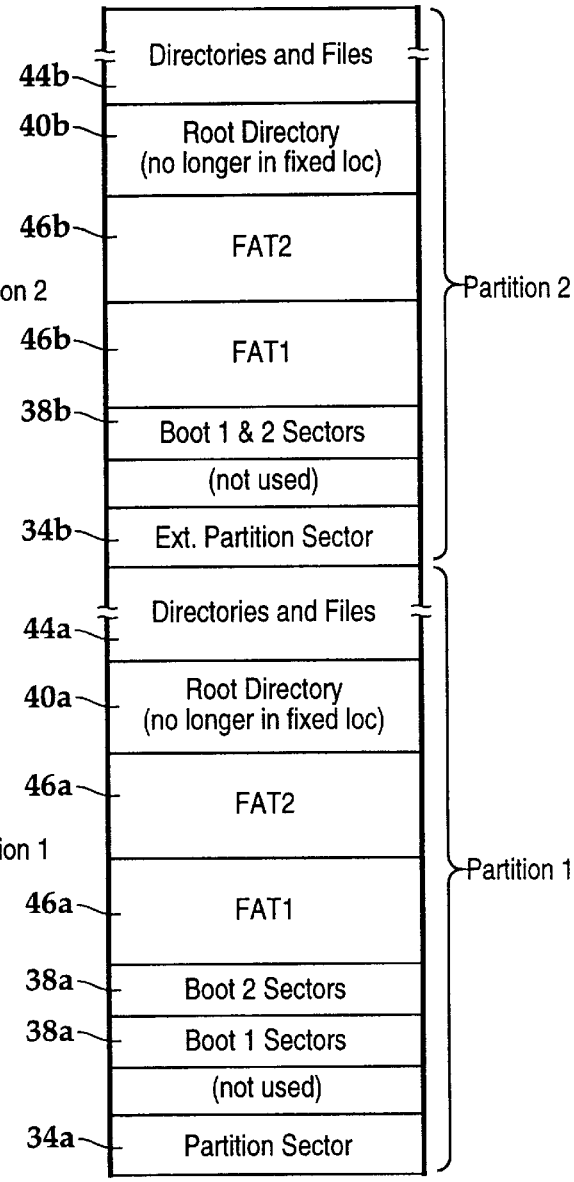
FIG. 2b is a schematic representation of the use of sectors in a mass data storage device storing files using the FAT-32 file system.
Figure 3:
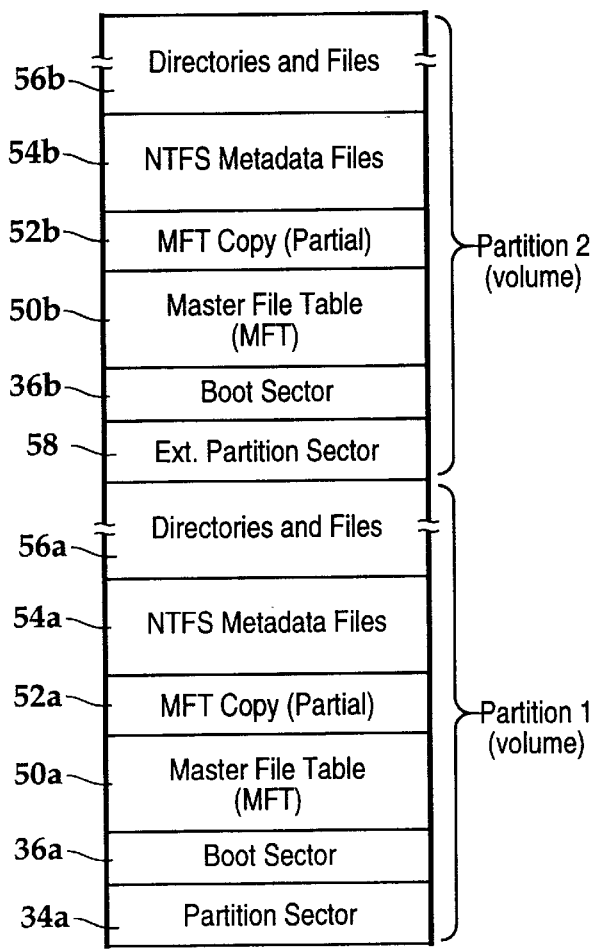
FIG. 3 is a schematic representation of the sectors of the use of sectors in a mass data storage device storing files using the NTFS file system.

In a preferred embodiment, the invention takes the form of a program of instructions stored in memory of computer, which are being executed by the CPU of a computer, such as CPU 12 of the computer 10 in FIG. 1. The program is loaded into the computer from a floppy disk (such as floppy disk 17 in FIG. 1) or other removable storage media inserted into a bootable storage device. The operating system is not loaded. To access or communicate with the disk drives and other I/O devices, the program relies on the computer's BIOS or other permanently-resident, hardware specific, I/O device access routines. In the following description, like numbers refer to like parts.

Figure 4:
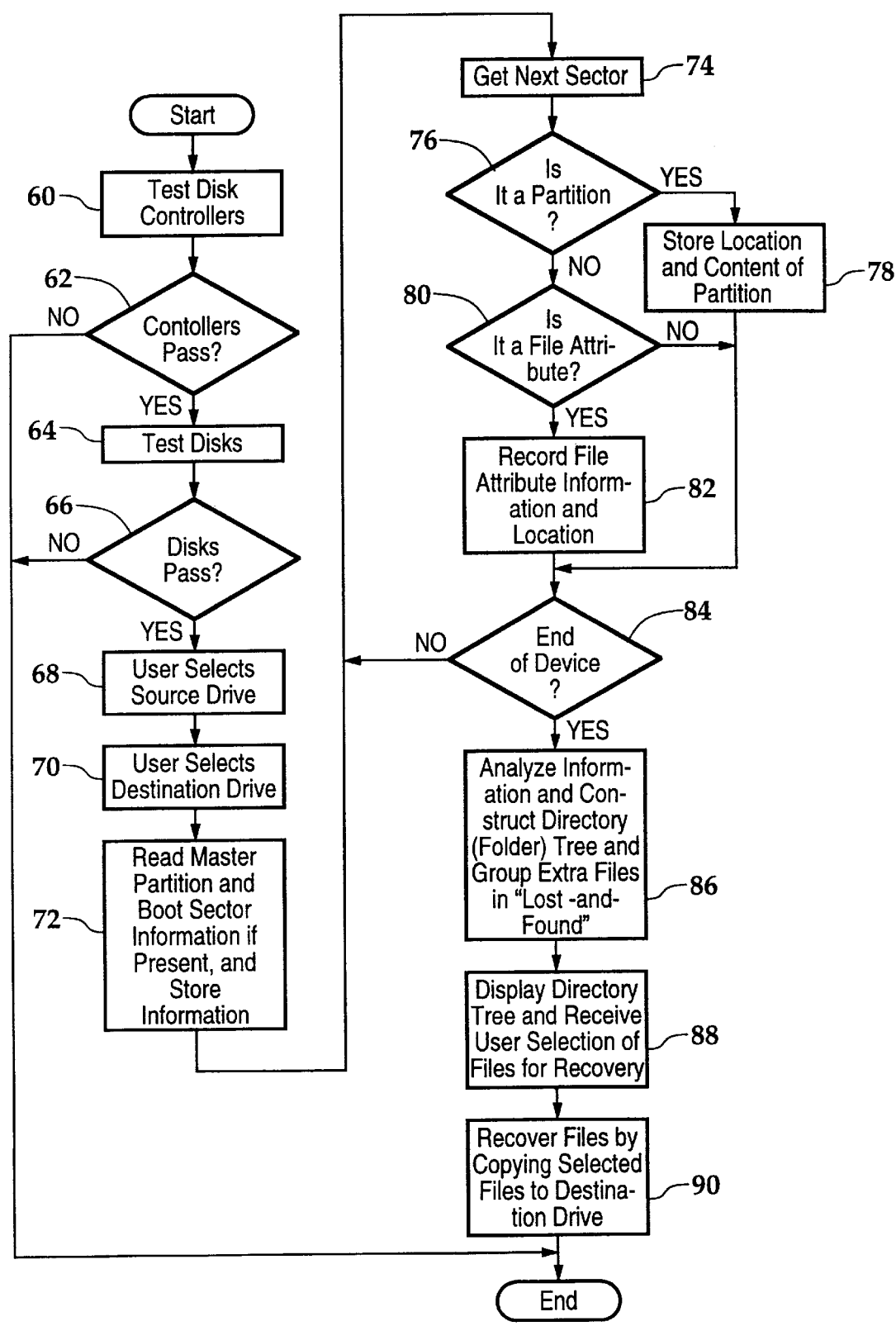
FIG. 4 is a flowchart illustrating steps of a computer process for recovering lost files from a mass data storage device of a computer.

Referring to FIG. 4, a computer under the control of the program starts by testing each controller for each disk drive (or other mass data storage device used for storing files) in the computer at step 60 to determine whether they are functioning properly. At decision step 62, if none of the controllers pass, the process ends. Otherwise, the devices with working controllers are tested at step 64. The drive must function electronically to recover data. If none pass at decision step 66, the process ends. Otherwise, the user is prompted at step 68 to select one of the working storage devices as a source, and to select at step 70 another of the working storage devices as a destination. The source storage device contains the files to be recovered, and the destination storage device is the storage device to which recovered files will be copied.

At step 72, the computer begins a process of a sector-by-sector scan of the source storage device to identify, and thus locate the physical address of, sectors containing file system information. In particular, at step 72, the computer reads the master partition sector and boot sectors, which are at predetermined sector addresses. The data in each sector is checked to determine whether it matches the signatures and data patterns necessary for valid sectors using data "filters." If, the information appears valid, it is stored in a data structure set up in the working memory (such as main memory 14 in FIG. 1) of the CPU, in which information collected by the scan will be stored for subsequent analysis. A "filter" is a predefined signature and/or data pattern, against which data in the sector is compared. Briefly, signature matching involves looking for predefined byte values in certain offsets or locations (either absolute or relative to other byte values) within a sector, or within a cluster of sectors. For example, in the FAT file systems, the last two bytes in the partition sector and the boot must have the values aa55h. Pattern matching involves looking at patterns in the placement and value of the bytes in the sector, or groups of sectors, that tend to uniquely identify that particular type of file attribute. A data pattern match may include checking to see if the byte values in certain locations within the sector or cluster assume one of certain permitted values, or are within a range of permitted values. In NTFS, for example, the "magic number" "FILE" can be searched for in order to identify the MFT and the magic number "INDX" can be searched for in order to identify index buffers.

Next, the process begins a sector-by-sector read, comparing the contents of each sector to a series of data filters to look for other partitions and file attributes (for example, other root directories and directories, including folders in the FAT-32 and MAC OS file systems, and, in NTFS, index buffers, certain NTFS metadata and/or other non-resident file attributes.) The address and information contained in found file attribute sectors are stored in the data structure set up in the working memory of the computer.

At step 74 the computer gets the next sector. If, as indicated by decision step 76, the sector is identified, through signature matching, to be an extended partition, its contents and physical address (logical block address or cylinder, head, sector address) are stored, at step 78, in the data structures set up in the working memory. If the sector is not a partition sector, its contents are matched to data filters to determine if it is a file attribute.

As indicated by decision step 80, if the sector is part of a file attribute, the address and content of the file attribute are stored in the data structure in the working memory of the computer at step 82. It should be noted that, since most current operating systems allocate space in a storage device in a cluster of sectors, the filtering or analysis of a sector may also involving analyzing the contents of other read sectors in conjunction therewith, assuming a minimum cluster size, to confirm that the sector is part of a cluster that contains a file attribute or partition. As indicated by decision step 84, the process of repeats by getting the next sector, until the physical end of the storage device is reached.

By the forgoing process, partitions, directories and fragmented directories, and other file attributes can be located, even when the master partition sector is corrupted, the root directory is missing, FAT tables or MFTs are corrupted, or SPC information is missing from the boot sector.

Once the scanning and filtering process is complete, the process moves to step 86, wherein the information collected during the scan is used to reconstruct directory trees of files for display to the user. Briefly, this may include determining the number of sectors per cluster (SPC) and the cluster base (CB), for each partition or volume, if such information is not available from the boot sectors, and partition sectors or other file system data structures. Furthermore, the directories are checked to determine whether they are part of the current directory or folder structure (i.e. that they are not deleted or left from prior device formats). The chances of recovering each file is assessed based on whether cluster allocation information is available and appears valid. All files and directories which can't be placed in the directory tree are listed separately in a "lost and found."

At step 88, the directory tree and "lost and found" are displayed to the user in order to receive a user's selection of the files to be recovered. At step 90, the files are recovered by identifying and copying the clusters in which the file is stored to the destination drive in a manner which preserves the directory hierarchy, or as a compressed or uncompressed flat files. To the extent cluster allocation information is not available to chain clusters of the selected files together, the process can assume that the clusters in each file are sequential if the disk has been recently defragmented, or, if the disk is fragmented, automatically group remaining clusters, which have not been associated with a file, directory, file system data structure or other file attribute, by data type commencing with the smallest files and assuming a sequential allocation of clusters. Alternately, or in addition thereto, the computer process can allow user intervention by visually comparing in adjacent windows on a display the contents of an end of the last known cluster in a file to the contents at the beginning of one of the remaining unassociated clusters, been picked by a user from a listing of available clusters in another window arranged by location and cluster type.

Once all files are copied, the process ends. However, the scanning, analysis and file recovery steps can, if desired, be repeated, or the entire process restarted.

The following description of certain details of the forgoing process and apparatus is made in reference FAT file systems substantially as used by the DOS, WINDOWS 3.x and WINDOWS 95 operating systems, on a disk drive.

Figure 5:
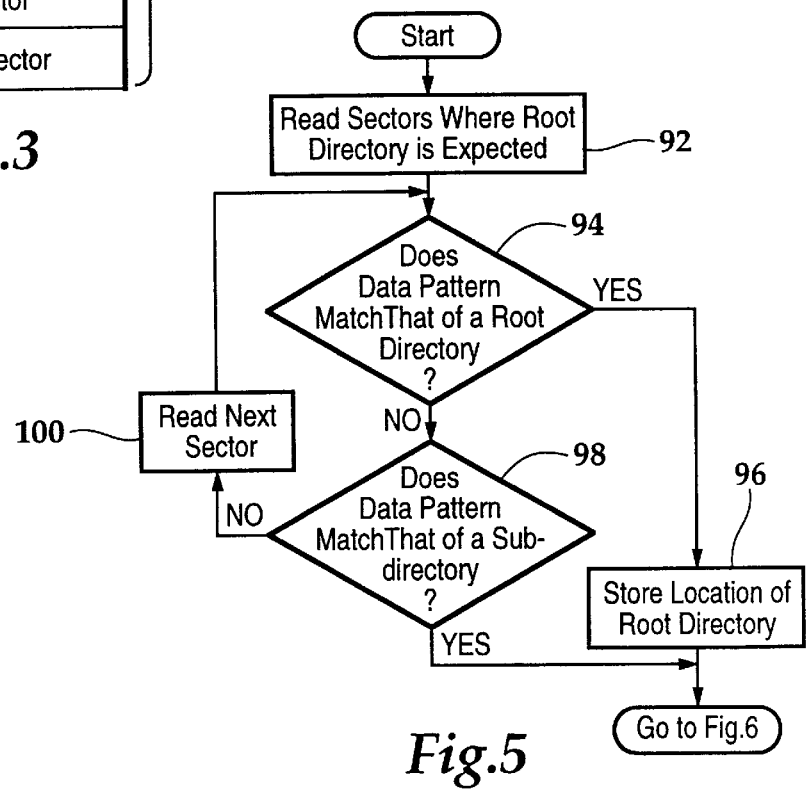
FIG. 5 is a flowchart of a computer process for locating a root directory—as part of the process of FIG. 4.

Referring to FIG. 5, the portion of the scanning process following reading of the master partition sector and boot sector of a storage device, which portion is generally identified by steps 74 to 82 of FIG. 4, starts by looking, as indicated by step 92, for the root directory of the first partition or volume on the storage device based on when it should be located. Furthermore, each slot or entry in the root directory is matched against a data pattern filter, which looks for permitted byte values in certain, predefined positions or fields within the entry. For example, the root directory will have in the name field of one of its entries a volume label. Furthermore, the process checks each entry for permitted byte values in the file name and file extension fields, as well as in date and time stamp fields for creation and last modification. If the root directory is found, as indicated by decision step 94, its address and contents are stored in working memory at step 96. However, if the data in the sectors do not match that expected for a root directory, it is matched against filters for user directories, which are also referred to herein as sub-directories, at decision step 98. These filters are similar to the ones used for the root directory. However, in the FAT file system, the signature bytes of "." and ".." are checked for in the names fields of the first two entries. If the sector is not part of a sub-directory, the next sector is fetched or read, and the process repeats looking for the root directory. If a sub-directory is found, however, it is assumed that the root directory is corrupted or missing, as sectors in the "data area" or user area are being read. The process then proceeds to FIG. 6.

Figure 6:
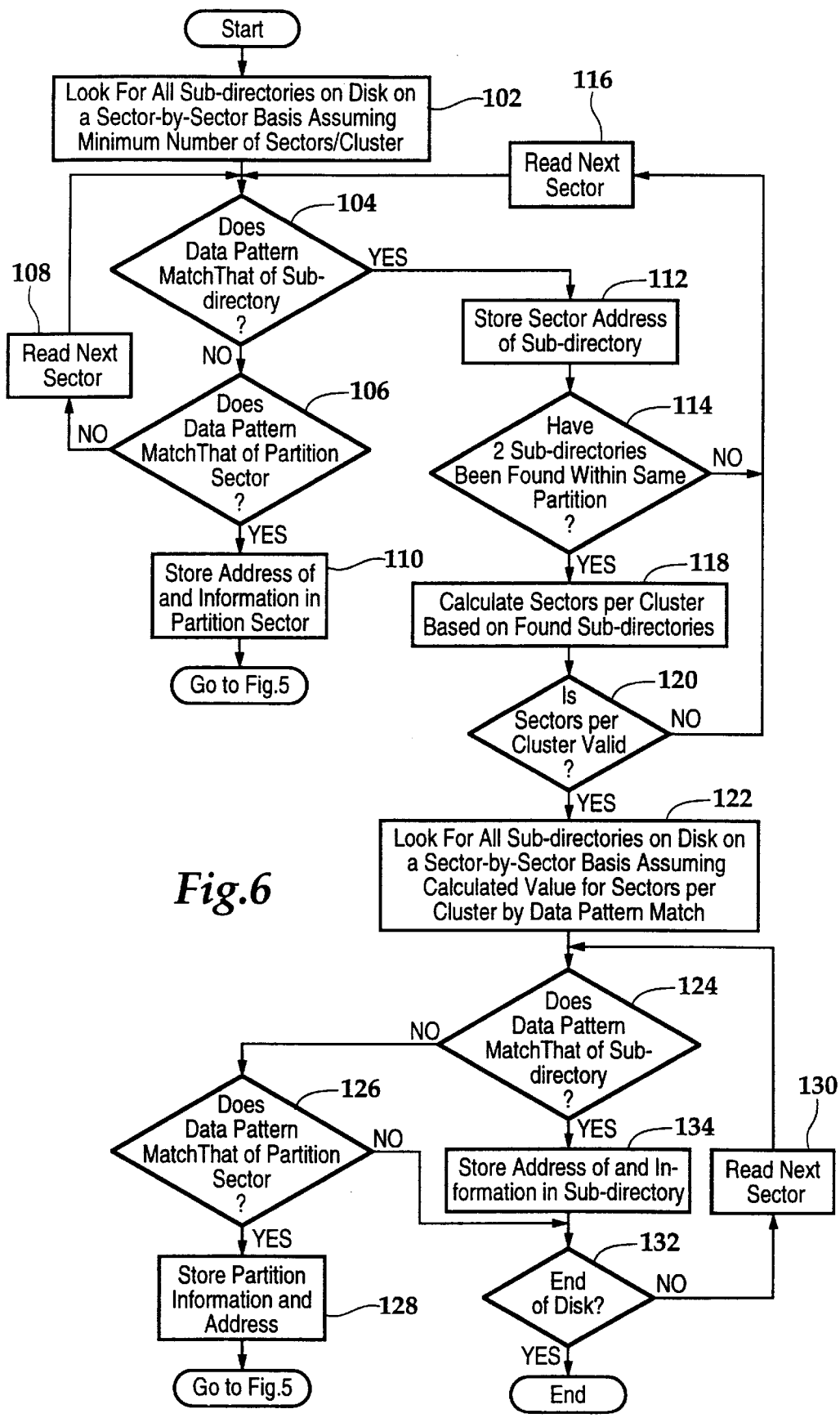
FIG. 6 is a flow chart of a computer process for identifying partitions, directories or other file attributes in a FAT system on as part of the process of FIG. 4.

Referring to FIG. 6, as indicated by decision block 102, a process of looking for additional sub-directories on the storage device is performed on sector-by-sector basis. The search assumes that the number of sectors per cluster are the minimum allowed by the file system. As by decision step 104 the processed reads the data pattern and compares it against a data pattern expected for a directory in a manner such as that discussed in connection with FIG. 4. If the data pattern does not match that of a directory process, it is checked against that of a partition sector at step 104. If the data pattern is not a match for that of the partition sector, then the process reads the next sector 108. However, if, at decision step 106, the data pattern matches that of the partition sector, the address of the sector is stored in the data structure kept in working memory at step 110. The process then returns to the steps of FIG. 5.

However, if asked step 104 the data pattern matches that of a set directory the address of the said directory is stored. If, at decision to step 114, two sub-directories have not been found within the same partition, and other words, this is the first sub-directory found within the partition, the process loops back to step 104 while it reads the next sector at step you 116. However, if two sub-directories have been found within the same partition at decision step up 114, the number of sectors per cluster is calculated at step 118 based on the starting sectors of the two sub directories. Having this information better enables, and speeds up, recognition of directories.

The following formulas may be used to calculate the sectors per cluster (SPC) and the cluster base (CB):

$$SPC = (LBA_{dir2} - LBA_{dir1})/(C_{dir2} - C_{dir1}) \quad (1)$$

$$CB = (LBA_{root} + Sectors_{root}) - (2 \times SPC) \quad (2)$$

For formula (1), the "LBA" refers to the logical block address of the beginning sector of the particular directory noted in subscript, and C is the starting cluster address found in the "." entry in the directory noted in the subscript. If the directories are adjacent to one another and small, then the LBA of each directory could be simply subtracted to find the SPC, since directories are allocated at best one cluster in the FAT file system. In formula (2), Sectors$_{root}$ is the number of sectors in the root directory, and LBA$_{root}$ the logical block address of the first sector in the root directory. If the root directory is not found, then CB can be calculated using the following formula:

$$CB = (C_{dir1} \times LBA_{dir2} - C_{dir2} \times LBA_{dir1})/(C_{dir1} - C_{dir2}) \quad (3)$$

At decision step 120, the process determines whether the calculated SPC is valid. In order for the SPC to be valid, the number resulting from the calculation must be a power of 2. If the calculated SPC is not valid at step 120, the process of loops back to step 116, where the next sector is read and the process is repeated for that sector beginning with step 104.

At step 122, the process continues, if the calculated SPC is valid, to search, sector by sector, for other sub-directories and partitions, using the calculated value for the SPC for data pattern matching, in a manner similar to that of steps 106 and 108. At step 124, if the data pattern does not match that of a directory, it is compared to the data pattern filter for a partition at step 126. If a partition is found, then it is stored at step 128 stored in the process returns to that of FIG. 5. If the sector does not have a data pattern matching that of a partition sector, the processes reads the next sector at step 130, provided that the end of the disk has not been reached, as indicated by decision step 132. However, if the data pattern matches that of a directory at step 124, the address and to information in the directory is stored in the data structure of the working memory. If the sector is not the last on the disk, as indicated by decision step 132, the next sector is a read at step 130, and the process loops back to decision step 124. As indicated by decision step 132, if the end of the desk has been reached, the process ends.

Figure 7:
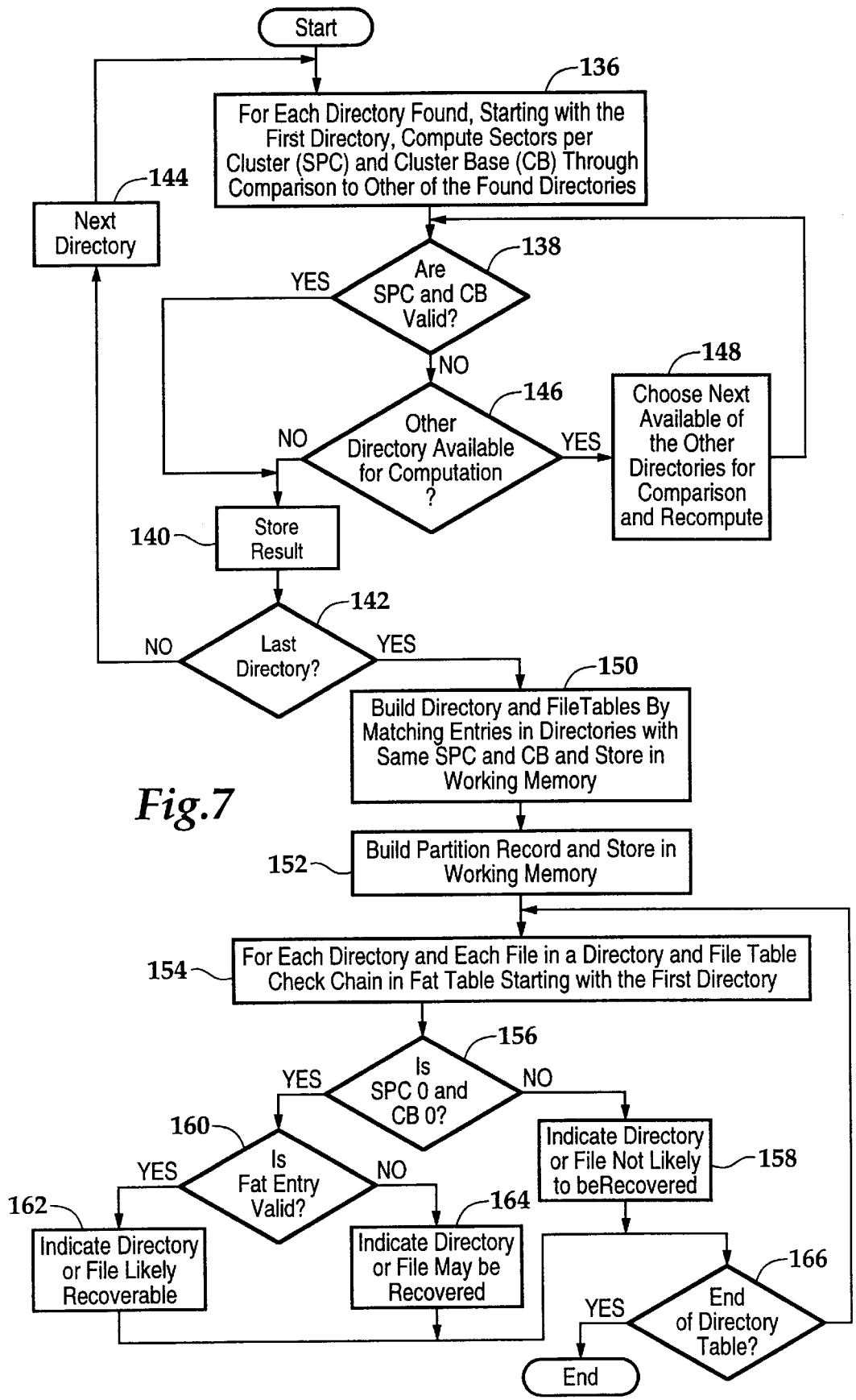
FIG. 7 is a flow chart of a process for calculating the number sectors per cluster and cluster base for each directory, and building tables of directories and files for selection for recovery.

Referring now to FIG. 7, as indicated by block 136, a value for the number of sectors per cluster (SPC) and the cluster base (CB) are calculated, using the formula (1) and either formula (2) or (3), set forth above, with the LBA of each directory found in the scan as LBA$_{dir1}$. The process begins with the first directory, as indicated in step 136. The LBA of the next directory is used in an initial calculation of SPC and CB. At decision step 138, if the SPC and CB resulting from the calculation are valid as LBA$_{dir2}$ numbers—the SPC must be a power of 2, for example, and the LBA of the cluster base must be located somewhere between the end of boot director and the end of the root directory—the result is stored at step 140 and, as indicated by decision step 142, the process loops back to get the next directory at step 144 for comparison at step 136 so long as there are other directories for which calculations are to be made. However, if the SPC and CB are not valid, the process checks to see if there is another directory available for comparison at step 146. If one is not available, the invalid result is stored at step 140. If there is one available, it is selected at step 148 and SPC and CB recomputed. The process then loops back to step 138, for validation.

Once an SPC and CB is calculated for each directory, the process builds directory and file tables at step 150 and partition sectors at step 152, both of which are stored in the working memory of the computer. To rebuild the hierarchical directory structure, the directories are threaded together using the entries in the directory. Each of the directories in the structure must have the same SPC and CB. However, old directories left after a reformatting may have different SPC and CB values. These SPC and CB values are used to calculate the LBAs of the clusters making up each of the files in the directories. Directories which do not fit into the structure are placed in a lost and found category. These are placed in a "lost and found" list. Beginning at step 154, a loop is performed for each found directory, and each file listed in each found directory. This loop checks to determine whether the cluster chain of the directory or file in the FAT is valid, assuming that the FAT or its copy is found.

The FAT can be located using signature and data pattern matching. The beginning of each FAT always has the unique signature bytes of FFF8, if it is for a hard drive, or FF0, if it is for a floppy. Furthermore, the FAT always begins at a specific physical address, depending on whether it is a FAT-16 (C,H,S=0,1,2) or FAT-32 (C,H,S=0,2,1). It's size, however, is not known, because it depends in part on the number of clusters on the disk. However, the root directory, if its location is known, defines the upper boundary of the copy of the FAT. The FAT will also have numerous sequences of successive numbers, since most files are stored in sequences of clusters. Data pattern matching techniques can be used to assign a figure of merit to what is believed to be the FAT in order to judge whether it is valid or corrupt.

As indicated by decision step 156, if a valid SPC and CB are not calculated for a file's directory, it is indicated to the user, as step 158, as not likely to be recoverable. If, the directory has valid SPC and CB values, then the FAT is checked at decision step 160 to see if the file's cluster chain or "entry" is complete. This chain is stored in the data structure setup in the working memory. If it is complete, the file is indicated at step 162 to likely be recoverable. If it is not, the file is indicated at step 164 as possibly being recoverable. As indicated by decision step 166, the process loops back to step 154 until all of the files have been categorized.

Figure 8:
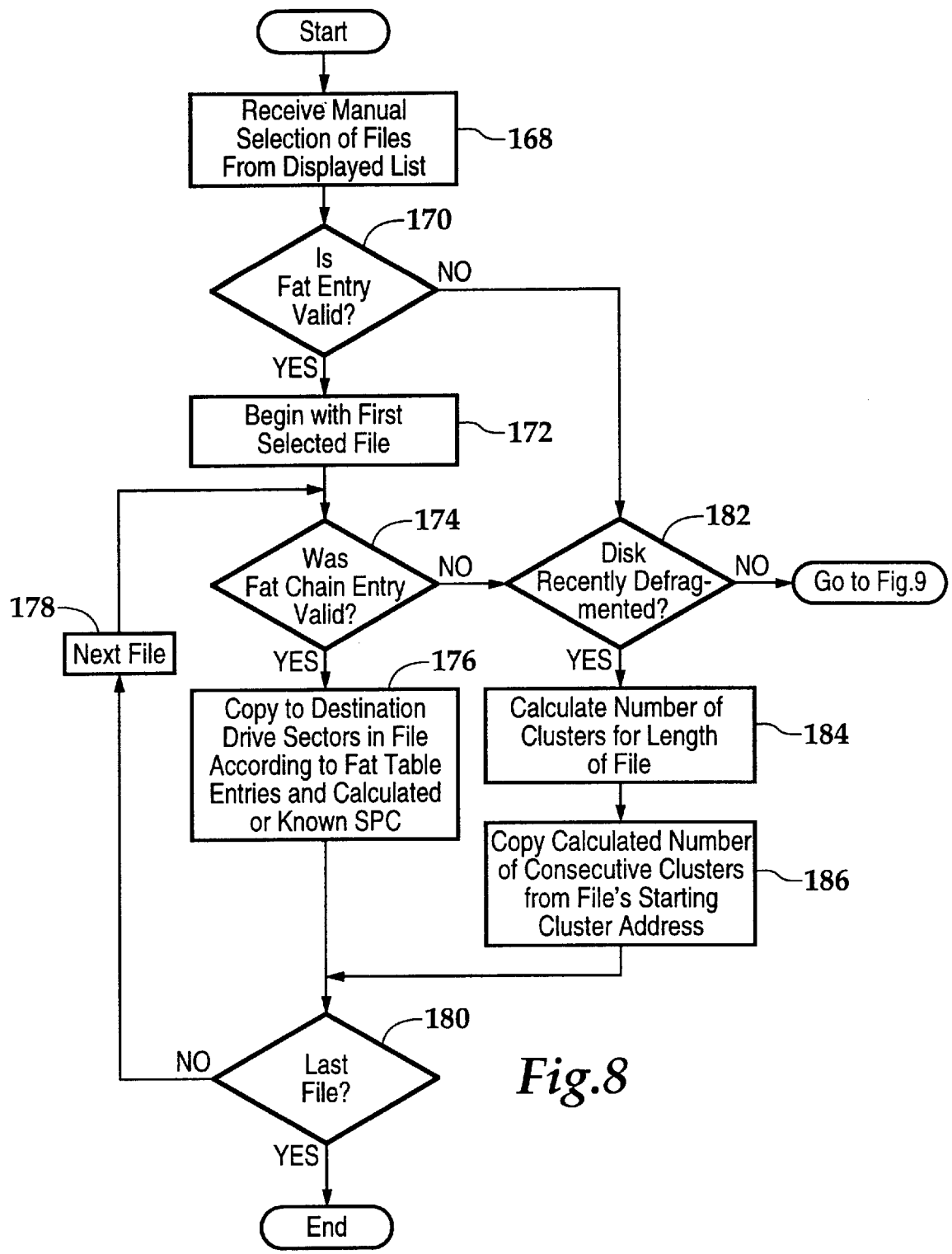
FIG. 8 is a flow chart of a computer process for recovering files having valid cluster chain information, particularly a valid FAT table, or when the data storage device is recently defragmented.
Figure 9:
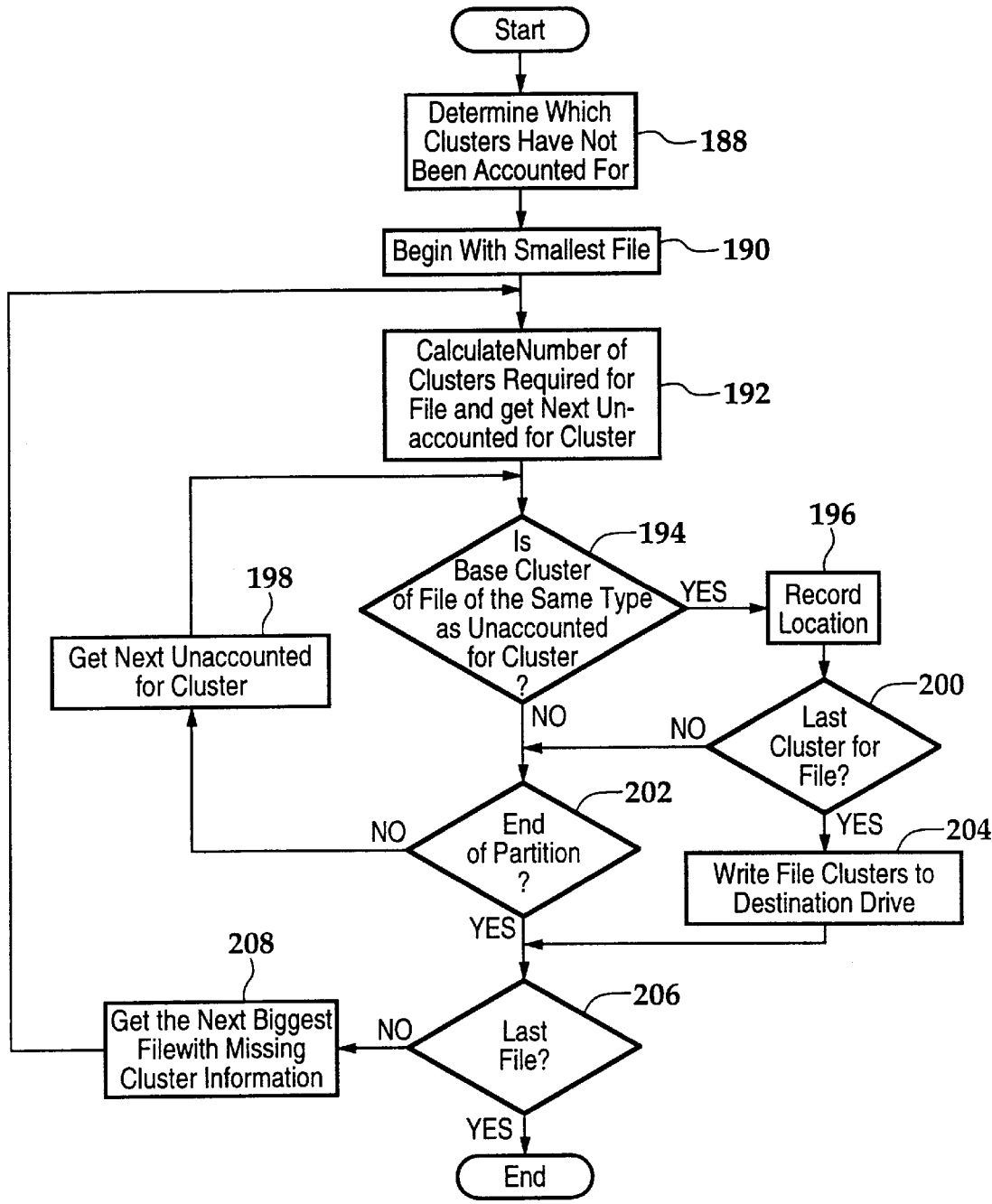
FIG. 9 is a flow chart of an automated computer process for recovering files with missing or invalid cluster chain information, particularly, missing or invalid FAT table entries, in fragmented data storage device.
Figure 10:
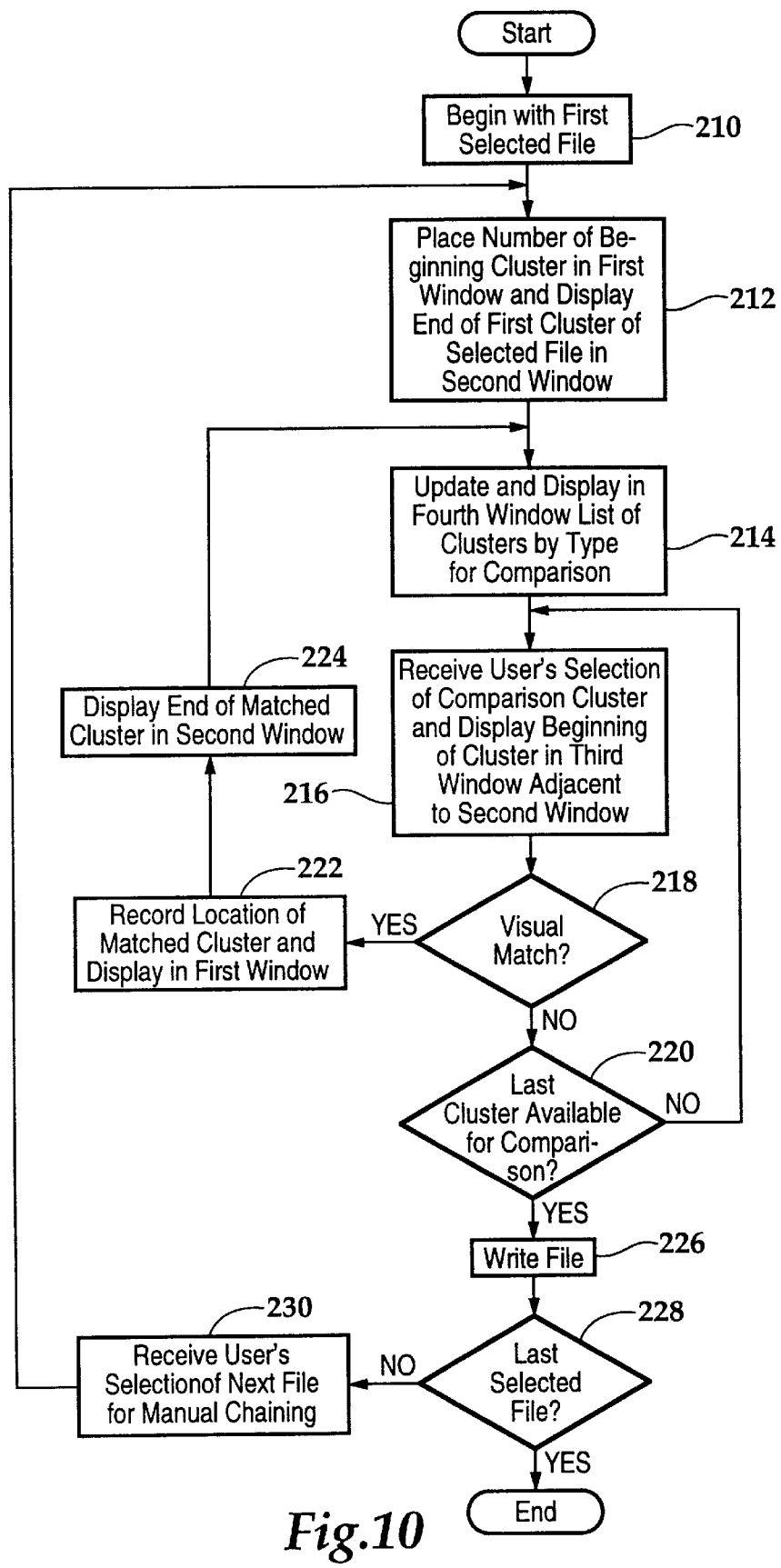
FIG. 10 is a flow chart of a user-controllable computer process for recovering files with missing cluster chain information.

FIGS. 8, 9 and 10 illustrate different techniques for recovering files. Recovering a file requires the knowledge of its starting cluster, which can be found from directory entry for the file, the chain of the clusters making up the file, and the SPC and CB to calculate the LBA of each cluster. Referring to FIG. 8, an automatic file recovery process is illustrated. Files for recovery are selected by a user, at step 168, from list of files displayed on the computer's monitor.

If the FAT is valid, as indicated by decision step 170, the process begins with the first selected file, as indicated by step 172. If the selected file's cluster chain in the FAT table is valid, as indicated by decision step 174, the selected file is copied to a preselected destination drive at step 174. The process then returns to decision step 174 and repeats with the next selected file, as indicated by step 178, until the last selected file is copied, as indicated by decision step 180.

If the FAT table is invalid, as indicated by decision step 170, or if the selected file's cluster chain is invalid, as indicated by decision step 174, then the process proceeds decision step 182. If the disk has been recently defragmented, such that it is safe to assume that all of the selected file's clusters are sequentially allocated, then the process, at decision step 184, calculates the number of chains required, based on the size of the file found in the directory entry for the file. Using the starting cluster number from the directory entry, the calculated number of clusters are then copied to the preselected destination drive at step 186. After copying, the process gets the next file at step 178 if more files remain, and loops back to decision step 174. Otherwise, the process ends.

If the disk has not been recently defragmented, and the FAT table cannot be used to chain together the clusters of a file, another automated process illustrated in FIG. 9 may be used. Referring now to FIG. 9, illustrated is an automated process for grouping clusters based, in part, on the type of data stored in the clusters and an assumption that the clusters in the smallest files will be sequential, even in relatively fragmented drives. The process classifies the data in each of the clusters in one of a predefined number of classes, for example: PC text, Unix text, non text, or C/C++ source code, and compressed data. These classifications can be made based on the distribution of symbols within the cluster, and then comparing the distributions to figures of merit. At step 188, the process compiles a list of clusters which have not been accounted for as, for example, through a valid FAT table entry or part of a directory. The smallest of the user's selected files is chosen initially, at step 190, and the number of clusters required to hold the file, based on its size as recorded in its directory entry, is calculated. Its starting or base cluster data type is compared sequentially with each of the available clusters, starting with the next higher one to the file's starting cluster. If, at step 194, there is a data type match, the address of the cluster is recorded at step 196. The process then gets the next unaccounted for cluster at step 198 and loops back to step 194, until the last available cluster with the correct data type is found, as indicated by decision step 200, or until the end of the partition is reached, as indicated by step 202.

Once the last cluster of file is matched, the file is copied at step 204 to the preselected destination drive. Once the file is either copied or the end of the partition is reached without finding enough clusters to make up the file, the process loops back to step 192, provided there are additional, user-selected files, as indicated by decision step 206. In the loop, the next biggest file with missing cluster information is selected at step 208 for matching. This process repeats, each time getting the next bigger user-selected file, until all have gone through the recovery process.

The processes described in FIGS. 5–9 are described in specific reference to the FAT file systems. However, these processes, or their techniques or methods, can be applied to NTFS and other file systems, the primary differences involving the signature and data pattern filters that are applied during scanning of the storage device. For example, during scanning of a storage device storing NTFS files, the MFT can be found by looking for the number corresponding to the word "FILE", which is always found in the MFT. Index buffers are located by looking for the word "INDX". By using LCN and actual LBA, SPC and CB can be determined using two index buffers in the same way as the sectors per cluster is determined using directories or folders in the FAT file systems. A corrupted or missing MFT and partial MFT is similar to having a missing root directory in the FAT file systems. Directories can be threaded, to the extent possible, using the contents of the index buffers, and the threaded directory structures put into the "lost and found" category. Names of the user files are part of the indexes in the index buffers.

Referring now to FIG. 10, as an alternate to using automatic methods of chaining together clusters when cluster allocation information is missing from the FAT, the illustrated process of FIG. 10 aids the user in "manually" chaining together clusters. Beginning with the first user-selected file, as indicated by step 210, the number of the starting cluster is displayed in a first window on the screen of a monitor or other user interface of the computer, and the end of its contents is displayed in a second window of the user interface. This step is indicated by block 212. At step 214, there is displayed in a fourth window a list of available clusters. In the third window, as indicated by step 216, there is displayed the beginning of an available cluster selected by the user for visual comparison. The second and third windows are in close, spatial proximity to facilitate comparison. If the user decides at decision step 218 that the two cluster's "match", that is belong together, the user so indicates and the computer records the address of the matched cluster and displays it in the first window, as indicated by step 222. At step 224, the computer then displays the end of the just-matched cluster in the second window. If user does not think that there is a visual match, the user may select another of the available clusters for comparison at decision step 220. If there are no more clusters available for comparison, the user can either go back to review the files (which step is not indicated on the drawings), or the user may proceed at step 226 to write the clusters which have been matched to a preselected destination drive. If there are more selected files at step 228, the computer receives the user's next selection at stop 230 and loops back to step 212 to repeat the process.

Figure 11:
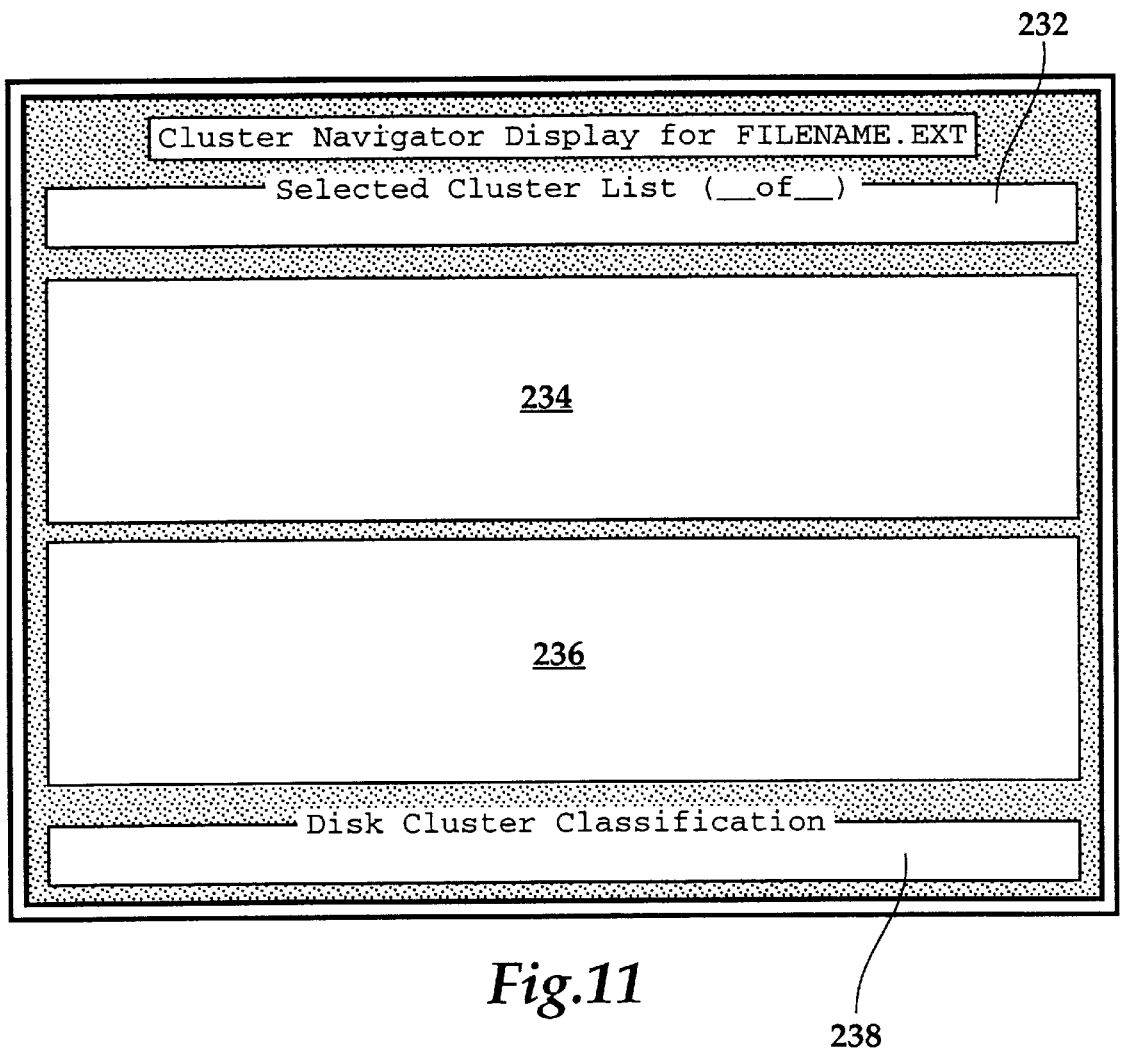
FIG. 11 is a diagram of a user screen interface for use in the process of FIG. 10.

Referring now FIG. 11, a layout of a screen interface for the process of FIG. 10 is illustrated. A first window 232 displays the cluster number of recently selected clusters in a second window 234. The second window displays the contents of the end of a last cluster that has been grouped as part of a file preselected by a user. A fourth window 238 displays a map of available clusters by data type for selection by the user. The third window 236 displays the beginning of the contents an available cluster chosen by the user for comparison. The second and third windows display both the values stored in the file on one side, and the symbols or characters encoded by those values based on the data type.

The invention has been described in reference to one or more exemplary embodiments. Modifications, substitutions and rearrangements of these embodiments can be made without departing from the scope of the invention set forth in the appended claims. The foregoing detailed description is not intended to limit the scope of the invention to the particular embodiments set forth therein.

What is claimed is:

1. A method for recovering files, wherein the files are organized in a hierarchical directory structure of an operating system's file system, from a first storage device of a computer when critical file system information is not available, the first file storage device being divided in a plurality of individually addressable sectors storing blocks of data, the method comprising the steps of:
   reading the first file storage device on a sector-by-sector basis;
   identifying sectors containing file attribute information stored by the file system in data structures by comparing data therein to predetermined data patterns;
   reconstructing the directory structure, at least in part, from the identified file attribute information; and
   copying a file in the reconstructed directory structure to a second file storage device.

2. A method for recovering files that are stored on a mass data storage device of a computing system and that are organized into a hierarchical file storage system used by an operating system, the mass data storage device being divided into a plurality of individually addressable blocks, called herein sectors, for storing blocks of data, each sector having an address, the method comprising:
   reading from the mass data storage device on a sector-by-sector basis;
   identifying sectors containing file system data structures by comparing data therein to predetermined data patterns and/or signatures found in data structures of the file system;
   reading the information from the identified sectors; and
   reconstructing at least part of the hierarchical file storage system based on information read from the identified sectors.

3. The method of claim 2 further comprising copying a file listed within the at least partly reconstructed hierarchical file structure to a second mass data storage device.

4. The method of claim 2 wherein storage on the mass data storage device is allocated for storing files on a cluster-by-cluster basis, a cluster being comprised of one or a plurality of sectors.

5. The method of claim 4 further comprising determining a number of sectors per cluster and a base cluster address when this information is not available by reading the file system data structures.

6. The method of claim 5 wherein determining the number of sectors per cluster includes:
   identifying by an address for a first sector of each of the two file system data structures, each of the file system data structures including information for determining its starting cluster number;
   reading the information for determining the starting cluster number for each of the directories; and
   comparing the starting cluster numbers and the address of the first sectors of the file system data structures to determine the sectors per cluster.

7. The method of claim 5 wherein determining the number of sectors per cluster is calculated for each directory located in file system, and reconstructing the hierarchical file storage system includes determining a hierarchical file structure using file attribute information from those file system data structures having the same sectors per cluster and address for the first sector of the base cluster.

8. The method of claim 5, wherein determining the number of sectors per cluster includes:
   identifying an address for a first sector storing a first directory and an address for second sector storing a second directory;
   reading from the first directory an a starting cluster number for the first directory and from the second directory a starting cluster number for the second directory; and calculating the sectors per cluster by dividing the difference of the addresses of the first and second directories by the difference of the starting cluster numbers of the first and second directory.

9. The method of claim 5 wherein determining the cluster base address is calculated using the following formula, $$CB = (LBA_{root} + Sectors_{root}) - (2 \times SPC)$$

wherein CB is the cluster base address, $LBA_{root}$ is an address of the first sector of the root directory, $Sectors_{root}$ is a number of sectors in the root directory, and SPC is the sectors per cluster.

10. The method of claim 5 wherein determining the cluster base address includes:

identifying a first and a second directory;

determining a starting cluster number for the first and the second directory; and calculating the address of the base cluster with the following formula, $$CB = (C_{dir1} \times LBA_{dir2} - C_{dir2} \times LBA_{dir1}) / (C_{dir1} - C_{dir2})$$

wherein CB is the cluster base address, $C_{dir1}$ is a cluster number of the first directory, $C_{dir2}$ is the cluster number of the second directory, $LBA_{dir1}$ is an address of the first sector of the first directory and $LBA_{dir2}$ is an address for the first sector of the second directory.

11. The method of claim 4 further comprising:

receiving a selection of a file to be recovered from the at least partially reconstructed hierarchical file structure;

displaying in a first window on a user interface to the computing system an end portion of data from a last cluster storing data of the selected file; and displaying in a second window on the user interface to the computing system a beginning portion from a next available cluster not yet associated with a file.

12. The method of claim 11 further comprising displaying in a third window a list of clusters which have not been associated with a file and displaying in a fourth window a list of clusters which have been associated with the selected file.

13. The method of claim 4 further comprising:

receiving a plurality of selections for files to be recovered from the at least partially reconstructed hierarchical file structure; and for each file, starting with the smallest file and continuing in order to the largest file, sequentially stringing together clusters storing content of the same type as that stored in a known starting cluster until the sequence of clusters store an amount of data equal to the known size of the file.

14. The method of claim 2 wherein the file system data structures include at least one sub-directory, the sub-directory having a first entry having an entry storing a first predetermined data pattern and a starting cluster number for the sub-directory, and a second entry storing a second predetermined data pattern and a starting cluster number for a parent directory to which the sub-directory belongs.

15. The method of claim 2 wherein the file system data structures include index buffers for an MFT.

16. The method of claim 2 wherein the file system data structures include file folders.

17. The method of claim 2 wherein the file system data structures include a cluster allocation table.

18. The method of claim 2 wherein the file system data structures include a boot record.

19. The method of claim 2 wherein, the file system data structures include a partition sector;

the method includes identifying each partition sector; and reconstructing the hierarchical file storage system includes reconstructing a hierarchical file structure for each partition identified by a partition sector.

20. The method of claim 2 wherein identifying sectors containing file system data structures includes identifying a file system data structure containing cluster allocation information for files, and wherein the method further includes selecting a file to be recovered from the at least partially reconstructed hierarchical file structure, determining from the cluster allocation information what clusters contain data for the selected file, and copying the selected file.

21. The method of claim 20 wherein the cluster allocation information is stored in a File Allocation Table.

22. The method of claim 20 wherein the cluster allocation information is stored in a Master File Table.

23. A computer readable medium storing instructions for causing a computer to perform a process, when those instructions are read by the computer, for recovering files that are stored on a mass data storage device of the computer, wherein the files are organized into a hierarchical file storage system used by an operating system and the mass data storage device is divided into a plurality of individually addressable blocks, called herein sectors, for storing blocks of data, each sector having an address; the process comprising:

reading from the mass data storage device on a sector-by-sector basis;

identifying sectors containing file system data structures by comparing data therein to predetermined data patterns and/or signatures found in data structures of the file system;

reading the information from the identified sectors; and reconstructing at least part of the hierarchical file storage system based on information read from the identified sectors.

24. The computer readable medium of claim 23, wherein the process further comprises copying a file listed within the at least partly reconstructed hierarchical file structure to a second mass data storage device.

25. The computer readable medium of claim 23, wherein storage on the mass data storage device is allocated for storing files on a cluster-by-cluster basis, a cluster being comprised of a plurality of sectors.

26. The computer readable medium of claim 25, wherein the process further comprises determining a number of sectors per cluster and a cluster base address.

27. The computer readable medium of claim 26, wherein determining the number of sectors per cluster includes:

identifying by an address for a first sector of each of the two file system data structures, each of the file system data structures including information for determining its starting cluster number;

reading the information for determining the starting cluster number for each of the directories; and comparing the starting cluster numbers and the address of the first sectors of the file system data structures to determine the sectors per cluster.

28. The computer readable medium of claim 26, wherein determining the number of sectors per cluster is calculated for each directory located in file system, and reconstructing the hierarchical file storage system includes determining a hierarchical file structure using file attribute information from those file system data structures having the same sectors per cluster and address for the first sector of the base cluster.

29. The computer readable medium of claim 26, wherein determining the number of sectors per cluster includes:

identifying an address for a first sector storing a first directory and an address for second sector storing a second directory;

reading from the first directory an a starting cluster number for the first directory and from the second directory a starting cluster number for the second directory; and calculating the sectors per cluster by dividing the difference of the addresses of the first and second directories by the difference of the starting cluster numbers of the first and second directory.

30. The computer readable medium of claim 26, wherein determining the cluster base address includes reading from a root directory an address for a first sector of a root directory, determining a number of sectors in the root directory, and subtracting the product of the number of sectors per cluster and two.

31. The computer readable medium of claim 26, wherein determining the cluster base address includes:

identifying a first and a second directory;

determining a starting cluster number for the first and the second directory; and calculating the address of the base cluster with the following formula, $$CB = (C_{dir1} \times LBA_{dir\,2} - C_{dir2} \times LBA_{dir1})/(C_{dir1} - C_{dir2})$$

wherein CB is the cluster base address, $C_{dir1}$ is a cluster number of the first directory, $C_{dir2}$ is a cluster number of the second directory, $LBA_{dir1}$ is an address of the first sector of the first directory and $LBA_{dir2}$ is an address for the first sector of the second directory.

32. The computer readable medium of claim 25, wherein the process further comprises:

receiving a selection of a file to be recovered from the at least partially reconstructed hierarchical file structure;

displaying in a first window on a user interface to the computing system an end portion of data from a last cluster storing data of the selected file; and displaying in a second window on the user interface to the computing system a beginning portion from a next available cluster not yet associated with a file.

33. The computer readable medium of claim 32, wherein the process further comprises displaying in a third window a list of clusters which have not been associated with a file.

34. The computer readable medium of claim 33, wherein the process further comprises displaying, for each cluster that has not been associated file, a predetermined classification for the type of a data the cluster contains.

35. The computer readable medium of claim 25, wherein the process further comprises:

receiving a plurality of selections for files to be recovered from the at least partially reconstructed hierarchical file structure; and for each file, starting with the smallest file and continuing in order to the largest file, sequentially stringing together clusters storing data of the same data type as that stored in a known starting cluster until the sequence of clusters store an amount of data equal to the known size of the file.

36. The computer readable medium of claim 23 wherein the file system data structures include at least one sub-directory, the sub-directory having a first entry having an entry storing a first predetermined data pattern and a starting cluster number for the sub-directory, and a second entry storing a second predetermined data pattern and a starting cluster number for a parent directory to which the sub-directory belongs.

37. The computer readable medium of claim 23 wherein the file system data structures include index buffers for an MFT.

38. The method of claim 23 wherein the file system data structures include file folders.

39. The method of claim 23 wherein the file system data structures include a cluster allocation table.

40. The method of claim 23 wherein the file system data structures include a boot record.

41. The method of claim 23 wherein, the file system data structures include a partition sector;

the method includes identifying each partition sector; and reconstructing the hierarchical file storage system includes reconstructing a hierarchical file structure for each partition identified by a partition sector.

42. The method of claim 23 wherein identifying sectors containing file system data structures includes identifying a file system data structure containing cluster allocation information for files, and wherein the process further includes selecting a file to be recovered from the at least partially reconstructed hierarchical file structure, determining from the cluster allocation information what clusters contain data for the selected file, and copying the selected file.

43. The method of claim 42 wherein the cluster allocation information is stored in a File Allocation Table.

44. The method of claim 42 wherein the cluster allocation information is stored in a Master File Table.

45. A method for recovering a file that has been stored in a hierarchical file system on a mass storage device coupled with a computing system when cluster allocation information for the file is missing or corrupted, the file system allocating storage on a cluster by cluster basis, each cluster having a predetermined number of one or more individually addressable sectors; the method comprising:

determining a starting cluster and size for the file from the file system;

classifying the content of the starting cluster based on the type of data it contains;

assembling, in order, the starting cluster and each cluster following the starting cluster that has content of the same class as the starting cluster until the number the size of the data stored by the copied clusters equals that of the files.

46. A method for recovering a file that has been stored in a hierarchical file system on a mass storage device coupled with a computing system when cluster allocation information for the file is missing or corrupted, wherein the file system allocates storage on a cluster by cluster basis, each cluster has a predetermined number of one or more individually addressable sectors, and the file's a starting cluster and size are known; the method comprising:

displaying in a first window on a user interface to the computing system an end portion of data from a last cluster determined to be storing part of the file;

displaying in a second window on the user interface to the computing system a beginning portion from a second cluster subsequent to the first cluster; and receiving an indication of whether the data of the second cluster displayed in the second window belongs with the data of the last cluster.

47. The method of claim 46 further comprising:

classifying the content of the starting cluster based on the type of data it contains; and displaying a list with a classification of the data contained in a plurality of clusters subsequent to the starting cluster.

48. The method of claim 46 further comprising:

displaying in the first window an end portion of the second cluster if the indication is that the second cluster belongs to the first cluster; and displaying in the second window a beginning portion from a third cluster subsequent to the second cluster.

49. A method for determining partitioning of mass data storage device when information about the location of the partitions is missing or corrupted, the mass data storage device being divided into a plurality of individually addressable blocks, called herein sectors, for storing blocks of data, each sector having an address, the method comprising:

reading from the mass data storage device on a sector-by-sector basis;

identifying sectors containing partitions by comparing data therein to predetermined data patterns and/or signatures found in partitions; and reading the information from the identified partition sectors.

50. A method for finding boot records of mass data storage device when information about location of the boot records is missing or corrupted, the mass data storage device being divided into a plurality of individually addressable blocks, called herein sectors, for storing blocks of data, each sector having an address, the method comprising:

reading from the mass data storage device on a sector-by-sector basis;

identifying sectors containing partitions by comparing data therein to predetermined data patterns and/or signatures found in partitions; and reading the information from the identified partition sectors.

* * * * *